United States Patent
Martin (10) Patent No.: US 10,010,946 B2
(45) Date of Patent: Jul. 3, 2018

(54) APPARATUS FOR RETAINING A WORKPIECE, AND METHODS OF USE AND MANUFACTURE THEREOF

(71) Applicant: Honda Motor Co., Ltd., Tokyo (JP)

(72) Inventor: Jeffrey D. Martin, Troy, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 14/703,269

(22) Filed: May 4, 2015

(65) Prior Publication Data

US 2016/0325360 A1    Nov. 10, 2016

(51) Int. Cl.
*B23B 31/40* (2006.01)
*B23Q 3/02* (2006.01)
*B23Q 1/00* (2006.01)

(52) U.S. Cl.
CPC .......... *B23B 31/4033* (2013.01); *B23Q 1/009* (2013.01); *B23Q 3/02* (2013.01); *Y10T 279/1008* (2015.01); *Y10T 279/1045* (2015.01)

(58) Field of Classification Search
CPC .......... B25B 5/087; B25B 5/01; B23Q 1/009; B23Q 3/02; Y10T 279/1045; Y10T 279/1066; Y10T 279/1008; B23B 31/4033
USPC ..... 269/63, 53, 311, 47, 48.1, 48.2, 309, 32; 279/63, 2.12, 2.01, 2.17, 2.22, 2.03; 294/9.3; 29/784, 799
See application file for complete search history.

(56) References Cited

U.S. PATENT DOCUMENTS

| | | | |
|---|---|---|---|
| 236,096 A * | 12/1880 | Mundy | B21D 28/265 83/129 |
| 1,066,357 A * | 7/1913 | Yardley | B25B 1/08 269/188 |
| 2,860,547 A | 11/1958 | Stephan | |
| 3,111,326 A * | 11/1963 | Sattler | B23B 31/4033 279/155 |
| 3,517,939 A * | 6/1970 | Jaehn | B23B 31/4033 279/2.03 |
| 3,868,886 A | 3/1975 | Bondie | |
| 5,133,566 A | 7/1992 | Baker | |

(Continued)

FOREIGN PATENT DOCUMENTS

EP    614716 A1 * 1/1994
JP    07132403 A * 5/1995

*Primary Examiner* — Christopher M Koehler
*Assistant Examiner* — Mahdi H Nejad
(74) *Attorney, Agent, or Firm* — Kenealy Vaidya LLP (57) ABSTRACT

Some embodiments are directed to a fixing apparatus that includes a threaded adaptor, an arbor having a flange portion and a shaft portion, and a draw cylinder disposed such that rotation of the threaded adaptor moves the draw cylinder in axially upward and downward directions. A collet can be disposed around a periphery of the arbor so as to be coaxial with the draw cylinder, such that movement of the draw cylinder in the axially downward direction causes the draw cylinder to contact the collet and thereby cause the collet to also move in the axially downward direction. The collet can include axially extending channels that define fingers therebetween and interior coaxial surfaces that are configured to communicate with exterior coaxial surfaces of the arbor such that axially downward movement of the collet moves the fingers in a radially outward direction to thereby increase an exterior diameter of the collet.

20 Claims, 7 Drawing Sheets

(56) References Cited

U.S. PATENT DOCUMENTS

| | | | | |
|---|---|---|---|---|
| 5,240,361 | A | * | 8/1993 | Armstrong ............ F16B 19/109 |
| | | | | 269/48.2 |
| 5,397,135 | A | | 3/1995 | Smith |
| 5,431,416 | A | | 7/1995 | Thornton |
| 5,595,376 | A | * | 1/1997 | Hua .................... B23B 31/4046 |
| | | | | 269/48.1 |
| 5,806,859 | A | | 9/1998 | Saccomanno, III |
| 5,810,344 | A | * | 9/1998 | Nishimoto .......... B23B 31/1071 |
| | | | | 269/309 |
| 6,024,354 | A | * | 2/2000 | Yonezawa ............ B23Q 1/0081 |
| | | | | 269/309 |
| 6,241,228 | B1 | * | 6/2001 | Chupick ................ B23Q 1/009 |
| | | | | 269/311 |
| 6,412,766 | B2 | * | 7/2002 | Barbieux ............ B23B 31/4013 |
| | | | | 269/48.1 |
| 7,300,042 | B2 | * | 11/2007 | McClure ............... B25B 31/005 |
| | | | | 269/309 |
| 7,475,927 | B2 | * | 1/2009 | Maffeis .................... B25J 15/12 |
| | | | | 279/2.17 |
| 8,096,737 | B2 | | 1/2012 | Tada et al. |
| 8,257,003 | B2 | | 9/2012 | McCormick et al. |
| 2001/0030391 | A1 | * | 10/2001 | Barbieux ............ B23B 31/4013 |
| | | | | 269/48.1 |
| 2011/0233839 | A1 | * | 9/2011 | Haimer ................ B23B 31/113 |
| | | | | 269/57 |
| 2013/0147131 | A1 | | 1/2013 | Mitchell |
| 2013/0307230 | A1 | | 11/2013 | Haimer |
| 2014/0144003 | A1 | * | 5/2014 | Davies .................... F16B 39/12 |
| | | | | 29/525.02 |
| 2015/0151394 | A1 | * | 6/2015 | Liu ........................ B23Q 1/009 |
| | | | | 29/559 |
| 2016/0008894 | A1 | * | 1/2016 | Derheim ................ B23B 31/39 |
| | | | | 279/142 |

\* cited by examiner

APPARATUS FOR RETAINING A WORKPIECE, AND METHODS OF USE AND MANUFACTURE THEREOF

BACKGROUND

The disclosed subject matter relates to apparatus for retaining a workpiece, and methods of use and manufacture thereof. More particularly, the disclosed subject matter relates to methods and apparatus that secure a workpiece in place, such as in the contexts of pallet clamps, robot fingers, CNC tombstone jigs, general work holding and handling devices, etc.

It may be beneficial or necessary in many different contexts to hold a physical component or element (hereinafter "workpiece") in place. For example, a workpiece can be held in place on another object, such as on a pallet, to facilitate transportation of the object from one location or orientation to another. The workpiece may need to be held in place, i.e., immobile relative to the pallet, so that the workpiece can be subjected to a separate operation at each of the locations and/or orientations.

In the context of manufacturing, the workpiece can be repeatedly and precisely indexed and held in place on a pallet for a machining or assembly operation. In some situations, such as where the workpiece is an engine cylinder head, the workpiece may be held in a predefined position and orientation, while being subjected to machining processes and forces (e.g., cutting, drilling, centrifugal forces, vibrational forces, etc.).

SUMMARY

Work-holding devices can be indexed into three different layouts: swinging clamps (such as those configured to be maneuvered on a hydraulically driven pivoting clamp), collet clamps, and mandrel style clamp mechanisms. Each of these work-holding device layouts can be subject to advantage(s) and disadvantage(s) as compared to the other layouts, and can be selected based on performance, maintenance, cost and/or any other appropriate targets set for a particular workpiece.

Related art work-holding solutions exist in lathe-chucking applications for internal chucking of a workpiece. Some expanding collet assemblies can include an arbor flanged portion for securing the collet assembly to a machine tool spindle. In such a layout, a shaft portion of the arbor, which receives the collet sleeve, is concentric with the machine tool spindle. The spindle may cooperate with some type of centering device, such as a tapered recess on the arbor, to align the spindle with a draw bar that actuates the collet. Axial movement of the draw bar is achieved by hydraulic or pneumatic actuation of the machine tool spindle in the axial direction of the draw bar.

Different work locating stops, which are sleeve members that are each removably secured to a flange portion of the arbor, are used to engage the collet assembly with different workpieces. The work locating stop is disposed around a collet with space to enable the expanding collet to expand when actuated to grip the workpiece. During a clamping process, the collet can move the workpiece towards the machine tool spindle, in effect pulling the workpiece towards the collet assembly. The work location stop prevents or impedes the workpiece pulling effect because the work location stop provides a repeatable and accurate reference surface against which the workpiece abuts.

Other work-holding solutions can utilize a serrated mandrel that expands and bites into work hole walls of a workpiece. However, expansion of the serrated mandrel can damage the workpiece, such as by scratching and scarring the workpiece. The control mechanism may also be controlled by a hydraulic or pneumatic drive, which imprecisely drives expansion of the mandrel.

Related art work-holding devices may be subject to other disadvantages. For example, various components may only be suitable for use in chucking of lathes or other machining tools. In particular, one or more components of a hydraulically-driven collet for chucking tools can be incompatible with: workpiece orientation, a need for securing a workpiece without the use of a locating work stop, work hole configurations utilized in a workpiece pallet in a machining or assembly station, etc. In another example, a swing arm mechanism can interfere with machining processes.

It may therefore be beneficial to provide a work-holding mechanism that addresses at least one of the above and/or other disadvantages of the related art. For example, it may be beneficial to provide a workpiece holding mechanism that: does not involve swinging clamps (and their resultant interference with manufacturing processes); reduces, impedes or avoids damaging the workpiece; is generally compatible with different operations, etc.

Some embodiments are therefore directed to a fixing apparatus for removably fixing a workpiece to a pallet using an actuator. The fixing apparatus can include a threaded adaptor that is configured to be rotated by the actuator, and an arbor including a flange portion and a shaft portion that defines exterior conical surfaces. The arbor can define a channel that extends through both the flange and shaft portions. A draw cylinder can be disposed in communication with the threaded adaptor, such that rotation of the threaded adaptor moves the draw cylinder in axially upward and downward directions. The draw cylinder can include a draw shaft that is at least partially disposed within the channel of the shaft portion of the arbor. A collet can be disposed around a periphery of the shaft portion of the arbor so as to be coaxial with the draw shaft. The collet can be disposed such that movement of the draw cylinder in the axially downward direction causes the flanged head of the draw cylinder to contact the collet and thereby cause the collet to also move in the axially downward direction. The collet can include axially extending channels that define fingers therebetween and interior coaxial surfaces that are configured to communicate with the exterior coaxial surfaces of the shaft portion of the arbor, such that axially downward movement of the collet moves the fingers in a radially outward direction to thereby increase an exterior diameter of the collet.

Some other embodiments are directed to a pallet assembly for removably securing a workpiece. The pallet assembly can include a pallet, an actuator, and a collet assembly that is secured to the pallet. The collet assembly can include a threaded adaptor that is configured to be rotated by the actuator and an arbor including a flange portion and a shaft portion that defines exterior conical surfaces. The arbor can define a channel that extends through both the flange and shaft portions. A draw cylinder can be disposed in communication with the threaded adaptor, such that rotation of the threaded adaptor moves the draw cylinder in axially upward and downward directions. The draw cylinder can include a draw shaft that is at least partially disposed within the channel of the shaft portion of the arbor. A collet can be disposed around a periphery of the shaft portion of the arbor so as to be coaxial with the draw shaft. The collet can be disposed such that movement of the draw cylinder in the axially downward direction causes the flanged head of the draw cylinder to contact the collet and thereby cause the collet to also move in the axially downward direction. The collet can include axially extending channels that define fingers therebetween and interior coaxial surfaces that are configured to communicate with the exterior coaxial surfaces of the shaft portion of the arbor, such that axially downward movement of the collet moves the fingers in a radially outward direction to thereby increase an exterior diameter of the collet.

Still other embodiments are directed to a method of manufacturing a fixing apparatus that is configured to removably fix a workpiece to a pallet using an actuator. The method can include: configuring a threaded adaptor so as to be rotatable by the actuator; configuring an arbor so as to include a flange portion and a shaft portion that defines exterior conical surfaces, and so that the arbor defines a channel that extends through both the flange and shaft portions; disposing a draw cylinder so as to be in communication with the threaded adaptor, such that rotation of the threaded adaptor moves the draw cylinder in axially upward and downward directions; and configuring the draw cylinder so as to include a draw shaft that is at least partially disposed within the channel of the shaft portion of the arbor. The method can also include: disposing a collet around a periphery of the shaft portion of the arbor so as to be coaxial with the draw shaft, the collet being disposed such that movement of the draw cylinder in the axially downward direction causes the flanged head of the draw cylinder to contact the collet and thereby cause the collet to also move in the axially downward direction; and configuring the collet so as to include axially extending channels that define fingers therebetween and interior coaxial surfaces that are configured to communicate with the exterior coaxial surfaces of the shaft portion of the arbor, such that axially downward movement of the collet moves the fingers in a radially outward direction to thereby increase an exterior diameter of the collet.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Workpiece Pallet

Figure 1:
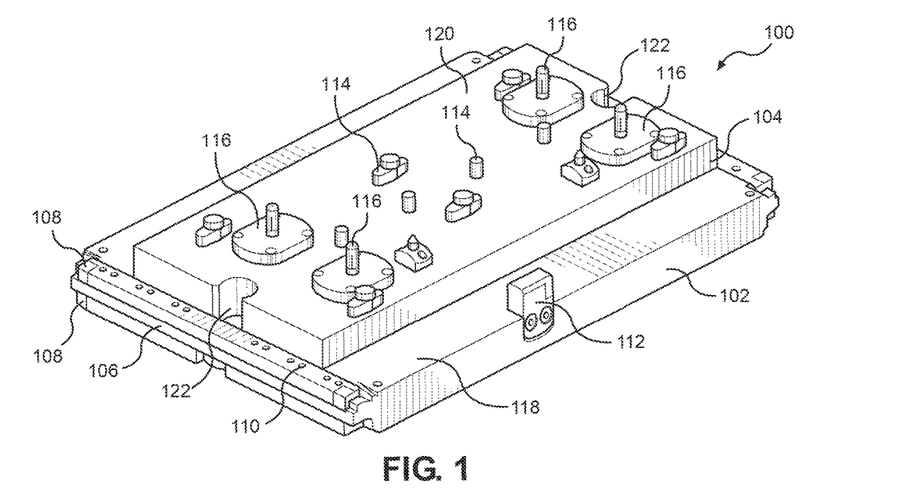
FIG. 1 is a perspective view of exemplary collet clamp assemblies installed within a workpiece pallet in accordance with the disclosed subject matter.
Figure 2:
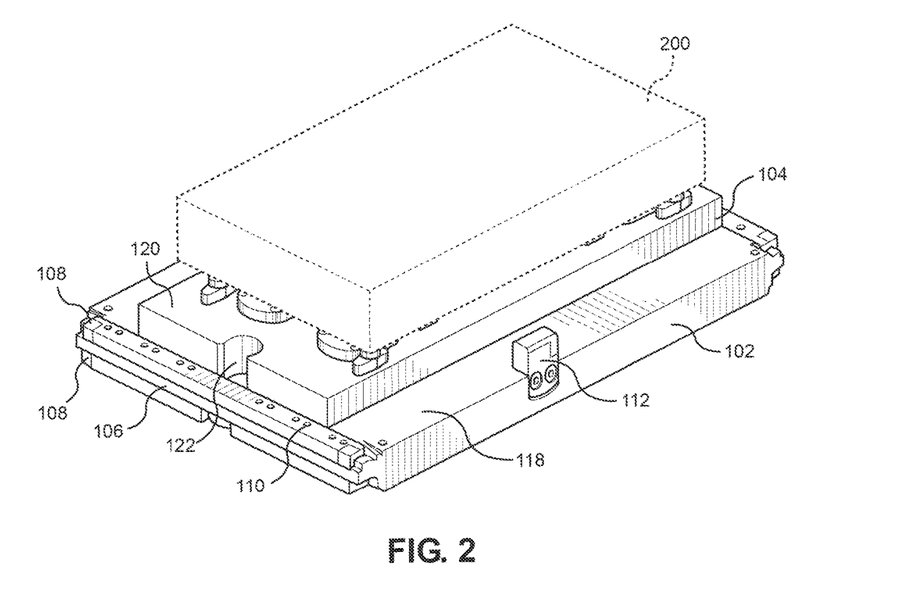
FIG. 2 is a perspective view of a workpiece mounted on the workpiece pallet of FIG. 1.

FIG. 1 is a perspective view of exemplary collet clamp assemblies installed in a workpiece pallet 100 in accordance with the disclosed subject matter; and FIG. 2 is a perspective view of a workpiece 200 (e.g., article of manufacture, such as an engine cylinder head) mounted on the workpiece pallet 100 in accordance with the disclosed subject matter. The workpiece pallet 100 can include a conveying portion 102 and a workpiece portion 104. The conveying portion 102 can be connected or secured to a mounting surface 118 of the conveying portion 102 in any appropriate manner, such as but not limited to mechanical fasteners, glue, epoxy, welding, pressure fitting, etc.

The conveying portion 102 can be formed as a unitary or multi-part body, and be configured in any appropriate shape that can support the workpiece portion 104 and the workpiece 200, such as at a machining station and/or during transport between different machining stations in a manufacturing transfer system. The conveying portion 102 can include end flange portions 106, transfer rails 108, attachment points 110, and a peripheral extension piece 112. Each lateral end of the conveying portion 102 includes an end flange portion 106 of identical size, extending a partial or entire width of the conveying portion 102. A transfer rail 108 can be mounted onto each upper and lower face of each end flange portion 106. Each transfer rail 108 can extend a partial or entire length of the end flange portion 106. In order to facilitate precise indexing of the workpiece pallet 100 into machining positions, a peripheral extension piece can be located on a side of conveying pallet 102. Additionally, attachment points 110 can be formed in the transfer rails 108 for receiving locating pins or other locating apparatus at a machining station and/or to aid with motion during transfer between machining stations.

The workpiece portion 104 can be formed as a unitary or multi-part body, and be configured in any appropriate shape that can support the workpiece 200, such as at a machining station and/or during transport between different machining stations in a manufacturing transfer system. The workpiece portion 104 can include mounting fixtures 114, grooves 122, and one or more collet clamp assemblies 116. The one or more grooves 122 can be provided in workpiece portion 104 for indexing the workpiece pallet 100 into machining positions or to accommodate transport between different machining stations. A mounting surface 120 can be provided with one or more mounting fixtures 114 that are arranged in any manner for supporting mounting points on the workpiece 200. The workpiece portion mounting surface 120 can also include one or more collet clamp assemblies 116 arranged in any appropriate locations that correspond to work holes in workpiece 200. For example, the collet clamp assembly 116 locations can conform to a pattern that can distribute the weight of the workpiece 200 across the workpiece pallet 100. As described in more detail below, each collet clamp assembly 116 can attach to the workpiece pallet 100 in any appropriate manner, such as but not limited to mechanical fasteners, glue, epoxy, welding, pressure fitting, etc.

The workpiece 200 can be any article that can be secured in a machining position and moved between assembly and/or machining stations as part of a manufacturing transfer system. In an embodiment, the workpiece 200 can include an engine block or portions thereof that can be mounted onto workpiece pallet 100. Other workpieces 200 can include any article of manufacture that can be secured onto the workpiece portion 104 by collet clamp assembly 116.

II. Collet Clamp Assembly

Figures 3, 4:
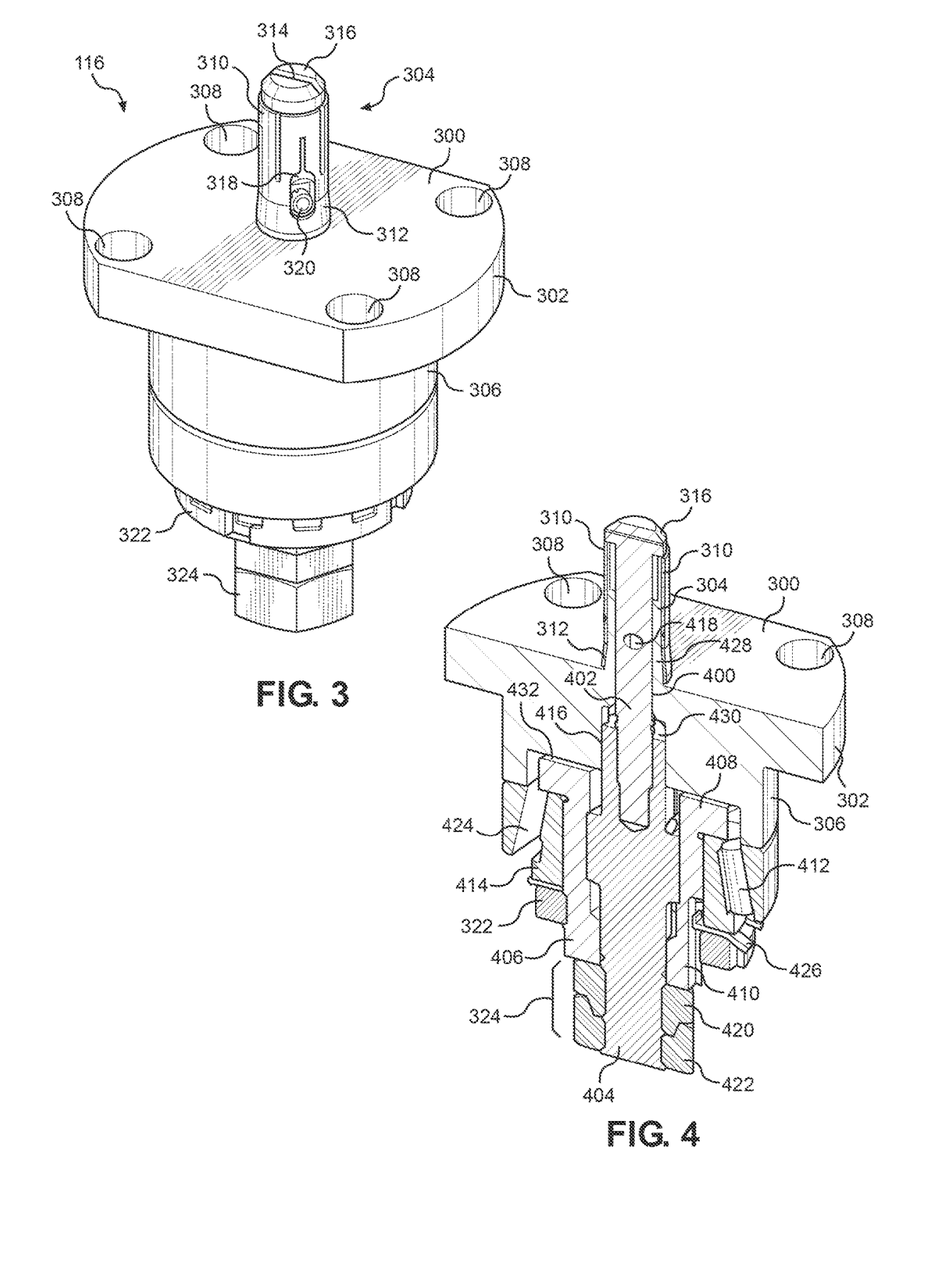
FIG. 3 is a perspective view of one of the collet clamp assemblies of FIG. 1.
FIG. 4 is a cross-sectional view of the exemplary collet clamp assembly of FIG. 3.

FIG. 3 is a perspective view of one of the collet clamp assemblies of FIG. 1, and FIG. 4 is a cross-sectional view of the collet clamp assembly of FIG. 3. An embodiment of the collet clamp assembly 116 can include an arbor 300, a draw bar 404, a draw plug 402, a collet 310, a stopper bushing 312, a socket 406, and a threaded adapter (e.g., a double lock nut) 324. As will be explained in detail below, during operation the collet clamp assembly 116 can be fixed to a rotating drive mechanism, such as a servo screw drive, that can be removably attached to the draw bar 404 via a double lock nut 324 or other attachment mechanism, in any manner, such as but not limited to mechanical fasteners, glue, epoxy, welding, pressure fitting, etc.

The arbor, or housing, 300 can include a flange portion 302, a cylindrical portion 306, and a shaft portion 304. The shaft portion 304 extends on one side of the flange portion 302 and the cylindrical portion 306 extends from an opposite side of the flange portion 302. The shaft portion 304 is concentric with the axis of rotation of double lock nut 324 and/or an external screw drive mechanism. A plurality of mounting holes 308 disposed in the flange portion 302 can be aligned with a plurality of threaded holes in workpiece portion 104 that cooperate with a plurality of bolts for securing the arbor 300 to the workpiece pallet 100, as best shown in FIG. 1.

The draw bar 404 is disposed in a recess, such as central bore 400, and is secured at its head to the draw plug 402, which is disposed in shaft portion 304 in any appropriate manner, such as but not limited to mechanical fasteners, glue, epoxy, welding, pressure fitting, etc. The draw bar 404 is disposed within a recess in the arbor (e.g., central bore 400).

Figure 5:
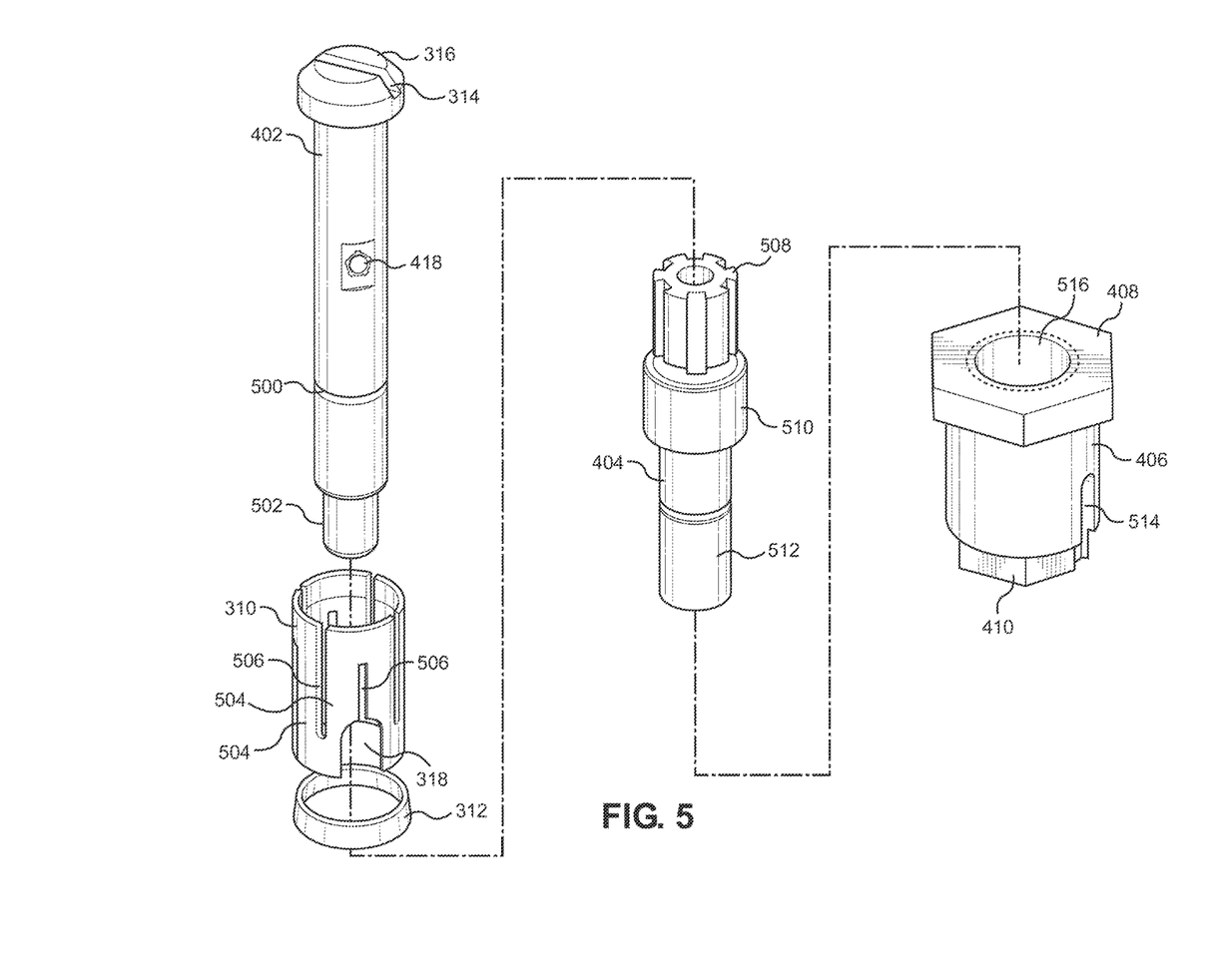
FIG. 5 is an exploded perspective view of the collet clamp assembly of FIG. 3.

FIG. 5 is an exploded perspective view of the collet clamp assembly of FIG. 3, and shows the draw bar 404 that includes a cylindrical shaft portion 512, a keyed (e.g., alternating key and slot) portion 508 disposed at an end of the draw bar 404 disposed towards the shaft portion 304, and an enlarged diameter shaft portion 510 disposed between the cylindrical shaft portion and the keyed portion 508.

The arbor stepped bore portion 416 includes a keyed receiver 430 that includes keys and slots disposed circumferentially that mirror keys and slots on the draw bar keyed portion 508. The arbor keyed receiver 430 can slidably receive the draw bar keyed portion 508 in a tongue-in-groove coupling. When coupled, the keyed receiver 430 impedes prevents rotational or lateral motion when the draw bar 404 is actuated.

The draw bar enlarged shaft portion 510 is received by socket 406, which is disposed within an expanded central bore 432 of arbor 300. The socket 406 includes a flanged head 408, reduced base 410, and hole 516 that is central to a longitudinal axis, and a notch 514, as best shown in FIG. 5. The socket 406 can support the draw bar 404 within the expanded central bore 432 and maintain the draw bar's axial alignment to the longitudinal axis of the arbor shaft portion 304 and an external servo screw drive. The socket hole 516 is sized to receive the draw bar 404, as described above, and to permit axial sliding motion therein when the draw bar 404 is actuated.

An adapter 322 functions to secure tapered adapter 414 against socket flanged head 408 within the expanded central bore 432. The notch 514 can receive a pin that can contact and oppose axial rotation of the socket 406. At least one pair of tapered roller bearings 412 is disposed between tapered wall 424 of the expanded central bore 432 and tapered adapter 414. Retainer clips 426 may be disposed between socket adapter 322 and tapered adapter 414 to secure the adapters in place. The socket adapter 322 may be attached to socket 406 in any appropriate manner, such as but not limited to threaded fittings, mechanical fasteners, glue, epoxy, welding, pressure fitting, etc., or no fasteners. The socket adapter 322 can also function as a seal to impede or prevent any debris, such as metal chips, fluids, etc., from entering the arbor 300 during the assembly and/or machining processes.

The base of the draw bar 404 can be threadably attached to the double lock nut 324 using cooperating screw threads. Double lock nut 324 can include a first part 420 that is disposed towards arbor 300 and a second part 422 that is disposed on a base of draw bar 404. The double lock nut first part 420 can maintain its position when the double lock nut second part 422 is rotated in a first direction (e.g. clockwise) or in a second direction (e.g., counterclockwise). When rotational motion of double lock nut second part 422 is initiated, longitudinal motion of draw bar 404 is actuated using the force of the threaded connection between the draw bar 404 and the double lock nut second part 422.

The arbor shaft portion 304 extends in a generally perpendicular direction away from flange portion 302 and includes a central bore 428 that is axially aligned with draw bar 404. The draw plug 402 is disposed axially through the arbor 300 in an opening in the shaft portion 304 and includes a flanged head 316 that is disposed at an exposed end, a draw plug shaft 500, and an opposite end that can include a reduced shaft portion 502. The reduced shaft portion 502 can be received by a recess in the draw bar keyed portion 508 and secured in any appropriate manner. such as but not limited to mechanical fasteners, glue, epoxy, welding, pressure fitting, etc. In an embodiment, the flanged head 316 may include a slot 314 for receiving a tool to turn the draw plug 402 within the draw bar 404. The collet 310 can be axially slidably disposed around the shaft portion 304. The flanged head 316 can engage an end of collet 310 as the draw bar 404 actuates the draw plug 402.

In an embodiment, the collet 310 is concentric with a servo screw drive when the collet 310 is installed on the shaft portion 304, based on the fact that the shaft portion 304 should be concentric with the servo screw drive axis. Adjustments for concentricity are therefore advantageously avoided during installation and operation.

An anti-rotation pin 320, disposed radially adjacent to a collet first frusto-conical surface 604 (See FIG. 6), provides a stop for the collet 310, i.e., to advantageously provide a limit to rotational motion of the collet 310 as it is actuated axially by the draw plug 402 on the shaft portion 304. The anti-rotation pin 320 is advantageously sealed in its pin slot 318 disposed in the collet 310 to impede or prevent debris from entering the inside of the arbor 300. The anti-rotation pin 320 protrudes above the surface of the shaft portion 304 and is disposed through pin slot 318 into a pin hole 418 in the draw plug 402.

The collet 310 includes a plurality of alternating slots 506 that form a plurality of adjacent gripping fingers 504 extending inwardly from opposite collet ends and are alternately interconnected at their top edge portions or bases, as best shown in FIG. 5. While the collet 310 is disclosed with eight gripping fingers 504 in FIG. 5 for sake of clarity, the collet 310 can include a greater or fewer number of gripping fingers 504, which can be tailored to facilitate relative ease of operation in a work space for a certain workpiece. For example, a greater number of gripping fingers 504 can provide a relatively greater gripping range within a work space of a workpiece 200.

Figure 6:
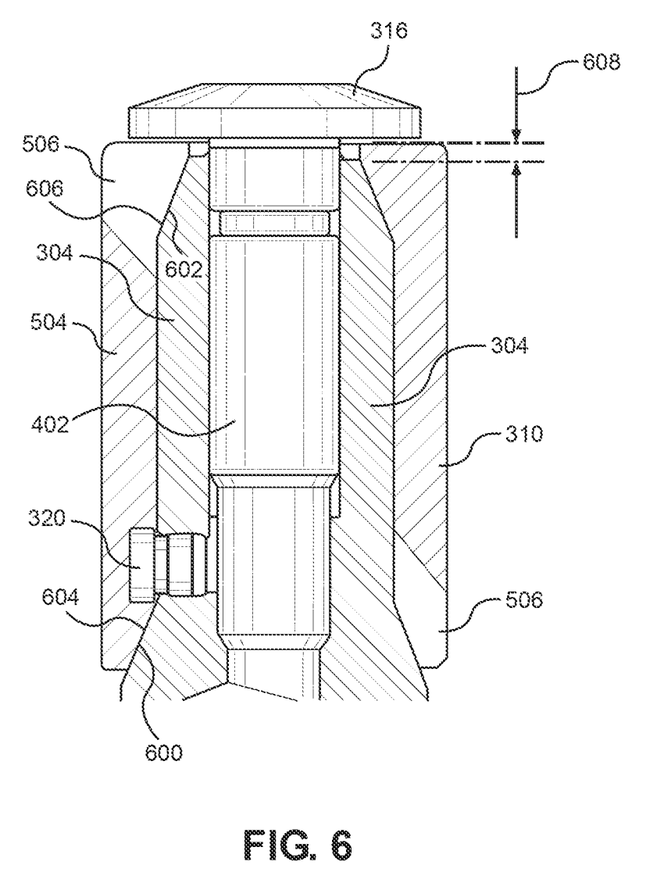
FIG. 6 is a detailed cross-sectional view of a draw plug and collet of the collet clamp assembly of FIG. 3.

FIG. 6 is a detailed cross-sectional view of a draw plug and collet of the collet clamp assembly of FIG. 3. The arbor shaft portion 304 includes a pair of annular and parallel frusto-conical surfaces disposed radially inwardly in the direction away from the flange portion, a first frusto-conical surface 600 disposed at its free end and a second frusto-conical surface 602 disposed adjacent to the flange portion 302, that cooperate with corresponding first frusto-conical surface 604 and second frusto-conical surface 606 on the collet 310, as best shown in FIG. 6. The collet 310 expands when it rides upon the frusto-conical surfaces 600 and 602 as it is actuated by the draw plug 402. The collet 310 may be constructed out of a material that provides a limited degree of resilience, thereby allowing the collet to return to an original shape when shifted from a first position to a second position, for example from an expanded position to a relaxed state, and any position between the expanded position and the relaxed state.

The stopper bushing 312 is a sleeve member secured to the arbor shaft portion 304 adjacent to the flange portion 302 in any appropriate manner, such as but not limited to mechanical fasteners, glue, epoxy, welding, pressure fitting, etc. The stopper bushing 312 can function to impede or prevent the base of collet 310 from moving longitudinally, which could displace the collet 310 from its intended location. The stopper bushing 312 also provides a stop for the collet 310 when draw bar 404 is actuated, which causes the collet 310 to expand laterally and grip a workpiece. The stopper bushing 312 may be advantageously removably secured to the arbor 300 such that different stopper bushings and collets may be used depending on the needs of different workpieces. Thus, to machine a different workpiece, the entire collet clamp assembly 116 need not be disassembled nor separated from a servo drive mechanism; only the stopper bushing 312 and/or collet 310 need be replaced. Furthermore, replacement of the stopper bushing 312 and/or collet 310 due to wear and tear can be readily accomplished.

Because the draw bar 404 is mechanically actuated in an axial direction by a servo screw drive, precise control over longitudinal motion of the draw bar 404, and in turn draw plug 402, can be accomplished. In the embodiments, the draw plug flanged head 316 can travel a maximum stroke distance 608, as best shown in FIG. 6. This precise control is accomplished via threaded cooperation between draw bar 404 and double lock nut 324.

III. Alternative Embodiment for a Collet Clamp Assembly

Figures 9, 10, 11:
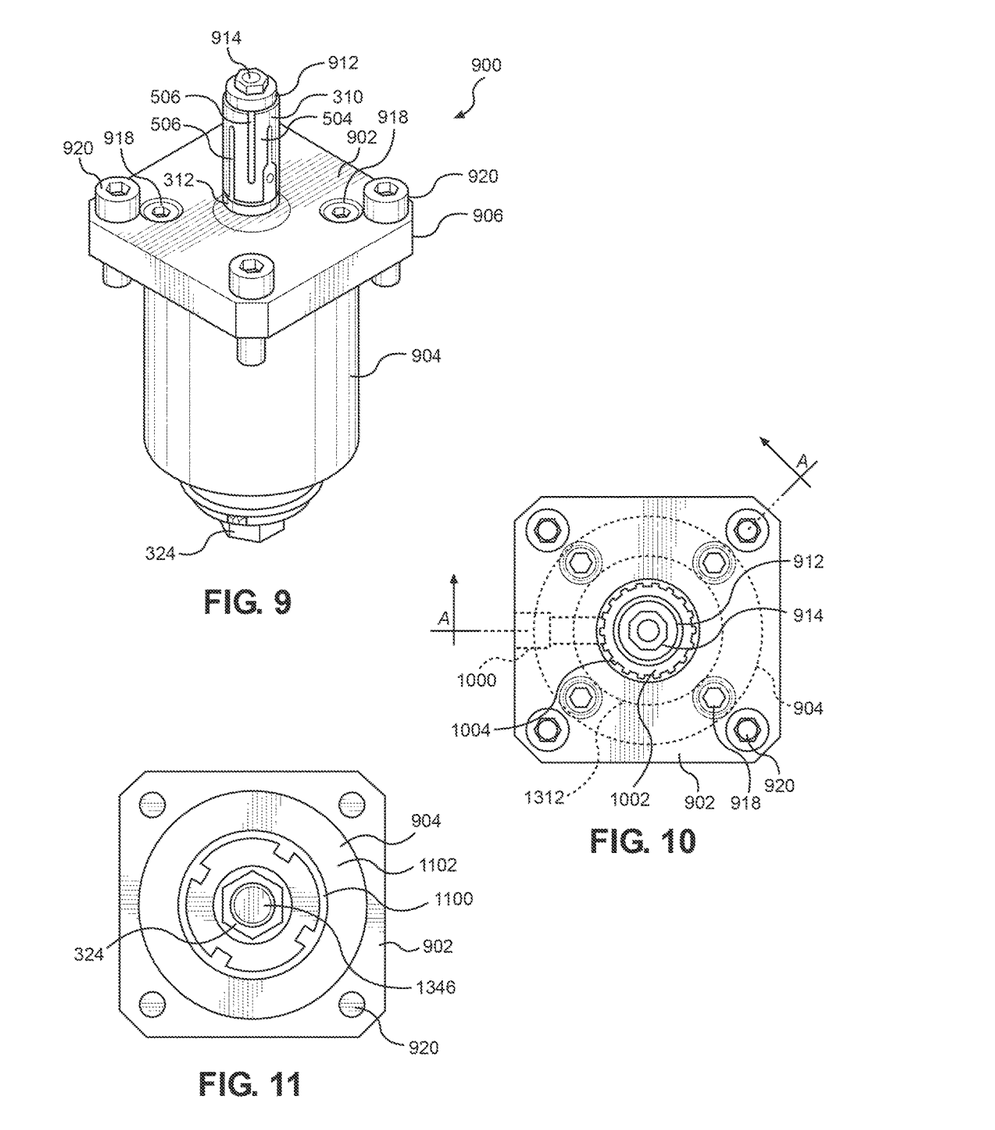
FIG. 9 is a perspective view of an alternative embodiment of a collet clamp assembly.
FIG. 10 is a top plan view of the alternative collet clamp assembly of FIG. 9.
FIG. 11 is a bottom plan view of the alternative collet clamp assembly of FIG. 9.

An alternative embodiment, which introduces some minor variations to the above-disclosed subject matter, is disclosed in FIGS. 9-13. Similar parts or elements in these figures retain the same identification as provided in the previously disclosed figures. FIG. 9 is a perspective view of the alternative embodiment of a collet clamp assembly, FIG. 10 is a top plan view of the alternative collet clamp assembly of FIG. 9, and FIG. 11 is a bottom plan view of the alternative collet clamp assembly of FIG. 9.

An alternative embodiment of the collet clamp assembly 900 can include an arbor 906, a single-piece draw bar 1002, the collet 310, a single piece socket 1302 (see FIG. 13), and the threaded adapter (e.g., the double lock nut) 324. As will be explained in detail below, during operation, the collet clamp assembly 900 is fixed to a rotating drive mechanism, such as a servo screw drive, that can be removably attached to the threaded adapter 324 in any manner, such as but not limited to threaded connections and mechanical fasteners.

Figure 13:
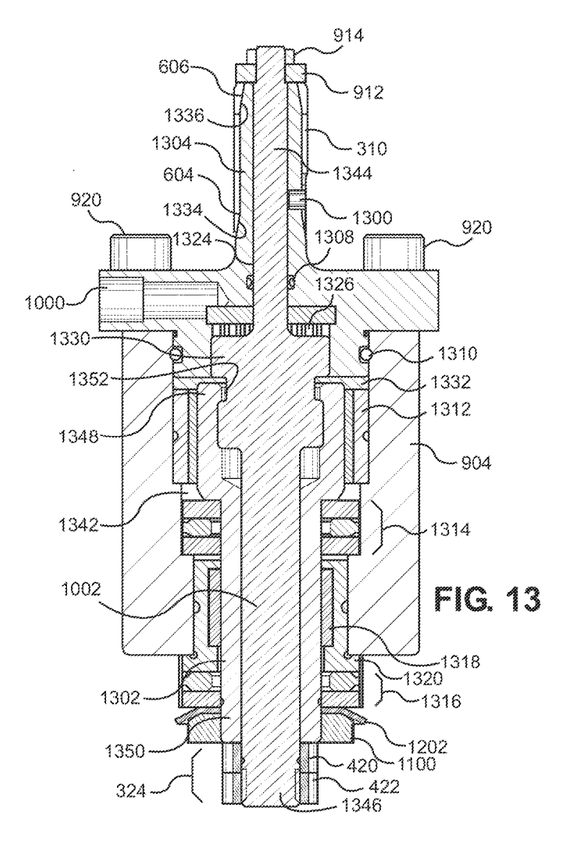
FIG. 13 is a cross-sectional view of the alternative collet clamp assembly of FIG. 9.

The arbor, or housing, 906 can include a flanged portion 902, a cylindrical portion 904, and a shaft portion 1304 (see FIG. 13). The shaft portion 1304 extends on one side of the flanged portion 902, and the cylindrical portion 904 extends from an opposite side of the flanged portion 902. The shaft portion 1304 is concentric with the axis of rotation of the double lock nut 324 and/or an external screw drive mechanism. A plurality of attachment screws 920 (or bolts, etc.) disposed in the flange portion 902 can be aligned with a plurality of threaded holes in workpiece portion 104 that cooperate for securing the arbor 906 to the workpiece pallet 100, as best shown in FIG. 1. A plurality of housing screws 918 (or bolts, etc.) disposed in the flange portion 902 can be aligned with a plurality of threaded holes in cylindrical portion 904 that cooperate for securing the flange portion 902 to the cylindrical portion 904.

FIG. 10 illustrates a top plan view of the single piece draw bar 1002, flanged head 912, and lock nut 914. FIG. 11 illustrates a bottom plan view of the collet clamp assembly 900 that includes the double lock nut 324, a single draw bar base portion 1346, a servo drive connector sleeve 1100 and servo drive protector 1102. The servo drive connector sleeve 1100 can receive a complementary connector from a servo drive mechanism and servo drive protector 1102 can function to enclose the double lock nut 324 to prevent dirt and debris from entering arbor 906.

Figure 12:
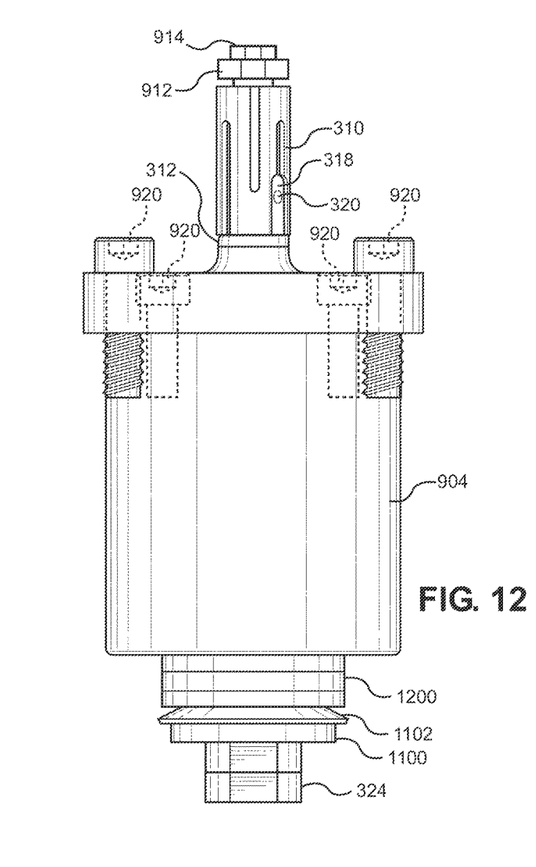
FIG. 12 is a side plan view of the alternative collet clamp assembly of FIG. 9.

FIG. 12 is a side plan view of the alternative collet claim assembly 900 of FIG. 9; and FIG. 13 is a cross-sectional view of the alternative collet claim assembly 900 of FIG. 9 that includes the single piece draw bar 1002 disposed axially within a recess of the arbor (e.g., in a central bore 1342 and shaft portion central bore 1324), and an adapter housing 1200. The single piece draw bar 1002 includes a head portion 1344, the base portion 1346, the keyed portion 1004, and an enlarged shaft portion 1330 disposed between the head 1344 and the base 1346. The head portion 1344 is slidably received by the arbor shaft portion 1304 and capped with a flanged head 912 and lock nut 914 or any appropriate manner to secure flanged head 912 to the single piece draw bar 1002, such as by mechanical fasteners, glue, epoxy, welding, pressure fitting, etc. The flanged head 912 can function similarly to the draw plug flanged head 316 of the previously disclosed exemplary embodiment.

As disclosed above, the arbor shaft portion 1304 includes a central bore 1324 or recess that can slidably receive the head portion 1344 of the single piece draw bar 1002. The expanding collet 310 can be axially slidably disposed around the shaft portion 1304. The flanged head 912 can engage an end of collet 310 disposed away from the flanged portion 902 to pull the collet against a stop, such as stopper bushing 312.

The collet 310 includes a plurality of alternating slots 506 that form adjacent gripping fingers 504 extending inwardly from opposite collet ends and are alternately interconnected at their top edge portions or bases, as best shown in FIG. 5. In the alternative embodiment, the collet 310 is concentric with a servo screw drive when the collet 310 is installed on the shaft portion 1304, based on the fact that the shaft portion 1304 is concentric with the arbor's 906 longitudinal axis. Adjustments for concentricity are therefore advantageously avoided during installation and operation.

The shaft portion 1304 includes a pair of annular and parallel frusto-conical surfaces disposed radially inwardly in the direction away from the flange portion, including a first frusto-conical surface 1334 disposed at its free end, and a second frusto-conical surface 1336 disposed adjacent the flange portion 902, which cooperate with corresponding first frusto-conical surface 604 and second frusto-conical surface 606 on the collet 310.

An anti-rotation pin 1300 is advantageously disposed in the collet 310 and sealed to impede or prevent debris from entering the inside of the arbor 300. The anti-rotation pin 1300 protrudes above the surface of the shaft portion 1304 and can be disposed in the single piece draw bar 1002.

The collet 310 expands when it rides upon the first and second frusto-conical surfaces 1334 and 1336 as it is actuated by the single piece draw bar 1002. Although the collet 310 is disclosed with eight gripping fingers 504 in FIG. 5 for sake of clarity, the collet 310 can include a greater or fewer number of gripping fingers 504, which can be tailored for relative ease of operation in a work space of a certain workpiece. For example, a greater number of gripping fingers 504 can provide a relatively greater gripping range within a work hole 700 of a workpiece 200. Furthermore, the collet 310 may be constructed out of a material that provides a limited degree of resilience, thereby allowing the collet to return to an original shape when shifted from a first position to a second position, for example from an expanded position to a relaxed position.

FIG. 10 further illustrates the longitudinally keyed (e.g., alternating key and slot) portion 1004 disposed on single piece draw bar 1002, and FIG. 13 shows the single piece draw bar 1002 and arbor 906 in cross-section. The arbor recess or expanded central bore 1342 includes a keyed receiver 1326 that includes keys and slots disposed circumferentially that can mirror the keys and slots disposed on the draw bar keyed portion 1004. The arbor keyed receiver 1326 can axially slidably receive the single piece draw bar keyed portion 1004 in a tongue-in-groove coupling. When coupled, the keyed receiver 1326 impedes or prevents rotational or lateral motion when the single piece draw bar 1002 is actuated. Alternatively or concurrently, a key hole 1000 can receive a pin (or bolt, etc.) that can contact and oppose axial rotation of the single piece draw bar 1002.

In the bore 1342, a stop adapter 1332 is disposed between the keyed portion 1004 and enlarged shaft portion 1330. The single piece draw bar 1002 can move axially in one direction until the enlarged shaft portion 1330 encounters the stop adapter 1332, and can move in an opposite direction until the keyed portion 1004 encounters the stop adapter 1332.

The enlarged shaft portion 1330 can be disposed within single piece socket 1302, which is disposed within the expanded central bore 1342. The single piece socket 1302 includes a flanged head 1348, reduced base 1350, and hole 1352 that is central to a longitudinal axis, as best shown in FIG. 13. The single piece socket 1302 can support the single piece draw bar 1002 within expanded central bore 1342 and maintain the single piece draw bar's axial alignment to the arbor shaft portion 1304 and an external servo screw drive. The socket hole 1352 is sized to receive the single piece draw bar 1002 and to permit axial sliding motion therein when the single piece draw bar 1002 is actuated. The single piece socket 1302 can be secured within expanded central bore 1342 with a series of spacers and/or adapters.

An adapter 1312 functions to secure the head portion 1348 of the single piece socket 1302 in axial alignment with the shaft portion 1304. Adapters 1314 and 1316 are disposed at distal ends of a spacer 1320 to secure the reduced base 1350 of the single piece socket 1302 in axial alignment with the shaft portion 1304. Spacer 1320 can include a bushing 1318 to secure spacer 1320 between single piece socket 1302.

One or more adapters 1316 can function as a seal to impede or prevent debris, such as metal chips, fluids, etc., from entering the arbor 906 during assembly and/or machining operations. Additionally, O-ring 1308 disposed around single piece draw bar head 1344, and O-ring 1310 disposed around keyed receiver 1326, can function as seals to impede or prevent debris, such as metal chips, fluids, etc., from entering arbor 906 during assembly and/or machining operations.

IV. Operation

Figure 7:
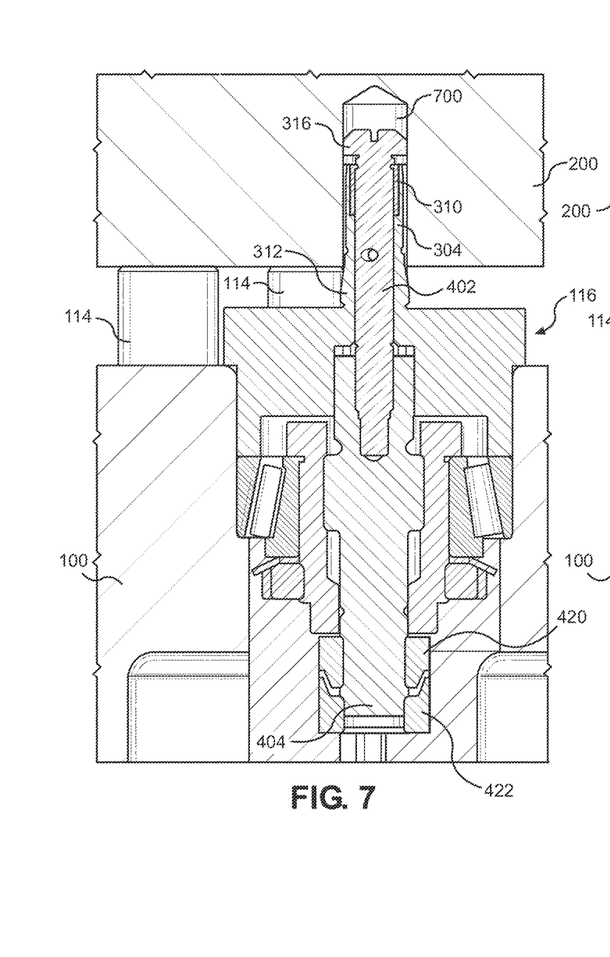
FIG. 7 is a cross-sectional view of an exemplary collet clamp assembly with the collet in a relaxed state.
Figure 8:
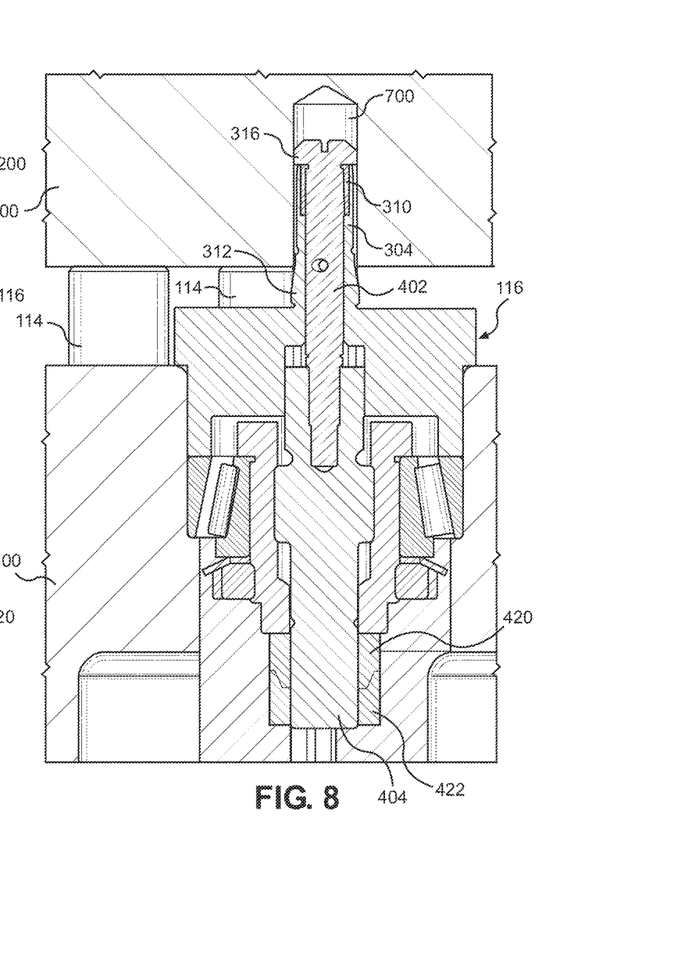
FIG. 8 is a cross-sectional view of an exemplary collet clamp assembly with the collet in an expanded position.

FIGS. 7 and 8 illustrate the operation of the exemplary embodiment for a collet clamp assembly 116, and in particular FIG. 7 is a cross-sectional view of an exemplary collet clamp assembly 116 in a first position with collet 310 in a relaxed state, and FIG. 8 is a cross-sectional view of an exemplary collet clamp assembly 116 in a second position, actuated into an expanded, or gripping, position. The operation is initially disclosed below in the context of the embodiment shown in FIGS. 1-6.

The threaded adapter (e.g., double lock nut) 324 can be secured to a servo screw drive or other precisely-controlled rotating mechanism. In particular, the first part 420 of double lock nut 324 can be secured to draw bar 404, and the second part 422 can be secured to a servo drive mechanism. To place the collet 310 into a relaxed state, the draw bar 404 is actuated by rotating a servo screw drive in a first rotatable direction (e.g., a counter clockwise direction). To move draw bar 404, a servo screw drive rotates the double lock nut second part 422 in the first rotatable direction to actuate motion of the draw bar 404 via the threaded connection between draw bar 404 and double lock nut 324. The draw bar 404 moves along an axial direction aligned with shaft portion 304, thereby moving the draw plug flanged head 316 away from an end of the collet 310. When the flanged head 408 no longer contacts the collet 310, tension is removed from the collet 310, and the collet 310 rides off of the first and second frusto-conical surfaces 600 and 602, placing the collet 310 into a relaxed state.

The workpiece 200 may be mounted to each collet clamp assembly 116 after each collet 310 on workpiece 200 is placed into a relaxed state. To mount the workpiece 200 to the workpiece pallet 100, the workpiece 200 can be positioned vertically over the workpiece portion 104, such that a pattern of one or more work holes 700 in workpiece 200 align with a corresponding pattern of one or more collets 310 of one or more collet clamp assemblies 116 disposed in workpiece pallet 100. The workpiece 200 is then lowered so that each work hole 700 can be mounted on an intended collet 310, as best shown in FIG. 7. The collet 310 should travel fully into the work hole 700, so that the highest frictional holding force can be exerted by the collet 310 on the workpiece 200.

To place the collet 310 into a gripping position, the double lock nut second part 422 is rotated by a servo screw drive in a second rotatable direction (e.g., a clockwise direction), and the draw bar 404 pulls the draw plug 402 towards the flanged portion 302. The draw plug flanged head 316 pushes the collet towards stopper bushing 312. The force of the flanged head 316 causes the collet 310 to expand when it rides upon the first and second conical surfaces 600 and 602. In an expanded or gripping position, the collet gripping fingers 504 grip the workpiece 200 using friction forces on inner walls of work hole 700. Because the workpiece 200 initially abutted the mounting fixtures 114, the workpiece 200 will remain in the same place during the collet clamping operation, ensuring that each workpiece 200 is located accurately every time, which is best shown in FIG. 8. The parallel first and second conical surfaces 600 and 602, cooperating with the first and second collet conical surfaces 604 and 606, advantageously provide parallel gripping of the workpiece 200 in the grip range, ensuring accurate gripping with uniform pressures.

To release the workpiece 200 from the collet 310, the collet 310 is again placed into a relaxed state. A servo screw drive may be rotated in the first rotatable direction (e.g., counterclockwise), which actuates the draw bar 404. As a result, the draw bar 404 moves axially towards the flanged portion 302, thereby moving the draw plug 402 away from an end of the collet 310. As the draw plug flanged head 316 ceases contact with the collet 310, the collet 310 rides down the first and second conical surfaces 600 and 602 and returns to its normal, relaxed shape, causing the collet gripping fingers 504 to release their grip on the inside walls of work hole 700. The anti-rotation pin 320 advantageously impedes or prevents relative rotation between the collet and the shaft portion 304 during the de-clamping operation. At this point, the workpiece 200 can be easily removed from the workpiece pallet 100.

The alternative embodiment for the collet clamp assembly 900 (shown in FIGS. 9-13) operates in a manner that is similar to the operation disclosed above. The threaded adapter (e.g., the double lock nut) 324 of the collet clamp assembly 900 can be secured to a servo screw drive or other precisely-controlled drive mechanism. To place the collet 310 into a relaxed state, the single piece draw bar 1002 is actuated by rotating a servo screw drive in a first rotatable direction (e.g., a counter clockwise direction). A first part 420 of double lock nut 324 can be secured to the single piece draw bar 1002, and a second part 422 can be secured to a servo drive mechanism. To move the single piece draw bar 1002, a servo screw drive rotates the double lock nut second part 422 in the first rotatable direction to actuate motion of the single piece draw bar 1002 via the threaded connection between the single piece draw bar 1002 and second part 422. As a result, the single piece draw bar 1002 moves axially away from the double lock nut 324, thereby moving the flanged head 912 away from an end of the collet 310. When the flanged head 912 no longer contacts the collet 310, tension is removed from the collet 310, and the collet rides off of the first and second frusto-conical surfaces 600 and 602, placing the collet 310 into a relaxed state.

To place the collet 310 in an expanded position, double lock nut second part 422 is rotated by a servo screw drive in a second rotatable direction (e.g., a clockwise direction), axially moving the single piece draw bar 1002 towards the double lock nut 324. The flanged head 912 engages and pushes the collet 310 towards stopper bushing 312, causing the collet 310 to expand when it rides upon the conical surfaces 1334 and 1336. The collet gripping fingers 504 then grip the workpiece 200 using friction forces on inner walls of a work hole (e.g., work hole 700). The parallel first and second conical surfaces 1334 and 1336, cooperating with the first and second collet conical surfaces 604 and 606, advantageously provide parallel gripping of the workpiece 200 in the grip range, ensuring accurate gripping with uniform pressures.

To release the workpiece 200 from the collet 310, a servo screw drive is rotated in the first rotatable direction (e.g., counterclockwise), which actuates the single piece draw bar 1002 to move in the first axial direction. As a result, the single piece draw bar 1002 moves axially from double lock nut 324, thereby moving the flanged head 912 away from an end of the collet 310. As the flanged head 912 moves away from the collet 310, the collet 310 rides down the conical surfaces 1334 and 1336 and returns to its normal, relaxed shape causing the collet fingers 504 to release their grip on the inside walls of the work hole 700. The anti-rotation pin 320 advantageously impedes or prevents relative rotation between the collet and the shaft portion 1304 during the de-clamping operation. At this point, the workpiece 200 can be easily removed from the workpiece pallet 100.

The disclosed embodiments can advantageously provide an alternative method of work-holding. Uses for the disclosed embodiments can include, but are not limited to, workpiece pallet clamps, robot fingers, CNC tombstone jigs, and general work-holding/handling devices. The collet claim assembly of the embodiments utilizes a screw mechanism that is capable of providing various advantages, including but not limited to achieving very high torque loads, which can translate as higher gripping forces, without (or with reduced) biting or scarring of the workpiece.

V. Alternative Embodiments

While certain embodiments of the invention are described above, and FIGS. 1-13 disclose the best mode for practicing the various inventive aspects, it should be understood that the invention can be embodied and configured in many different ways without departing from the spirit and scope of the invention.

For example, embodiments are disclosed above in the context of a collet with an exterior cylindrical shape. However, embodiments are intended to include or otherwise cover any shape of collet, such as but not limited to square, hexagonal, special shapes, etc., to suit the workpiece being gripped. Further, embodiments are disclosed above in the context of a collet constructed of spring steel. However, embodiments are intended to include or otherwise cover any type of flexible binding medium for a collet, such as but not limited to synthetic or natural rubber.

Embodiments are disclosed above in the context of an expanding collet. However, exemplary embodiments also are intended to include or otherwise cover other types of collets, such as tapered steel blocks held in a circular position by a flexible binding material, or an internal collet formed as a truncated cone that can be inserted into a work hole with an inner tube and an outer tube. The inner tube can expand with the force of the collet, pushing against the outer tube, which is held by friction forces of the expanded inner tube.

In the exemplary embodiment of FIGS. 1-6, the collet clamp assemblies 116 are arranged in a substantially vertical alignment in workpiece pallet 100. However, embodiments are intended to include or otherwise cover any appropriate positioning of the collet clamp assemblies 116 relative to the workpiece pallet 100.

FIG. 1 shows four collet clamp assemblies 116 disposed in each quadrant of workpiece pallet 100. Alternative embodiments may include a fewer or greater number of collet clamp assemblies 116 arranged in similar or different patterns that are appropriate for a certain workpiece 200. For example, more than four collet clamp assemblies 116 can be provided on workpiece pallet 100, or fewer collet clamp assemblies 116 can be provided.

In the exemplary embodiment of FIG. 4, the draw bar 404 is slidably secured by socket 406, and in FIG. 13 the single piece draw bar 1002 is slidably secured by single piece socket 1302. However, embodiments are intended to include or otherwise cover one or more adapters, sleeves, and/or reducing bushings that can slidably secure a draw bar aligned with a longitudinal axis of an arbor.

Exemplary embodiments are intended to include or otherwise cover any type of rotating drive mechanism and control system therefore that can couple to the draw bar 404 or single piece draw bar 1002. Exemplary embodiments are also intended to include or otherwise cover any type of coupling mechanism that couples a rotating drive to the draw bar 404 or single piece draw bar 1002.

Exemplary embodiments are further intended to cover omission of any one or both of the engine cover and the middle cover.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A fixing apparatus for removably fixing a workpiece to a pallet using an actuator, the fixing apparatus comprising:
   a threaded adaptor that is configured to be rotated by the actuator;
   an arbor including a flange portion and a shaft portion that defines exterior conical surfaces, the arbor defining a bore that extends through both the flange and shaft portions;
   a draw cylinder disposed in communication with the threaded adaptor such that rotation of the threaded adaptor moves the draw cylinder in axially upward and downward directions, the draw cylinder extending through the bore of the shaft portion of the arbor;
   a collet disposed around a periphery of the shaft portion of the arbor so as to be coaxial with the draw cylinder, the collet being disposed such that movement of the draw cylinder in the axially downward direction causes a flanged head of the draw cylinder to contact the collet and thereby cause the collet to also move in the axially downward direction, the collet including axially extending slots that define fingers therebetween and interior conical surfaces that are configured to communicate with the exterior conical surfaces of the shaft portion of the arbor such that axially downward movement of the collet moves the fingers in a radially outward direction to thereby increase an exterior diameter of the collet;
   a socket disposed around a periphery of the draw cylinder so as to be coaxial with the draw cylinder, the socket receives a portion of the draw cylinder therein as the draw cylinder moves axially upward and downward, the socket extends into the arbor, and the socket extends outside of the arbor; and
   a bearing located between the arbor and the socket such that the bearing rotatably supports the socket on the arbor.

2. The fixing apparatus as claimed in claim 1, wherein the draw cylinder includes a draw plug and a draw bar, the draw plug including the draw shaft and the flanged head, the draw bar defining lower circumferentially extending exterior surfaces that contact the threaded adaptor.

3. The fixing apparatus as claimed in claim 2, wherein the draw plug and the draw bar are unitarily formed.

4. The fixing apparatus as claimed in claim 2, wherein the draw plug and the draw bar constitute separate elements that are connected together.

5. The fixing apparatus as claimed in claim 2, wherein the draw bar defines upper circumferentially extending exterior keyed surfaces that communicate with interior surfaces of the flange portion of the arbor to impede rotation of the draw cylinder relative to the arbor.

6. The fixing apparatus as claimed in claim 1, wherein the threaded adaptor is a double lock nut that includes upper and lower coaxial portions, the double lock nut being configured such that rotation of the threaded adaptor in one direction causes the upper and lower portions to be separated, while rotation in another direction causes the upper and lower portions to be in contact with each other.

7. The fixing apparatus as claimed in claim 1, further including a sleeve member that is disposed between a base of the shaft portion of the arbor and the collet that is configured to impede axially downward movement of the collet when the exterior diameter of the collet has reached a fully expanded position.

8. The fixing apparatus as claimed in claim 1, further including a pin that is configured to extend through apertures in sidewalls of the collet and the draw cylinder, and is configured to impede rotation of the collet relative to the draw cylinder.

9. The fixing apparatus as claimed in claim 1, further including mounts that are configured to extend through apertures defined in the flange portion of the arbor and corresponding apertures defined in a mounting surface of the pallet to mount the arbor to the pallet.

10. The fixing apparatus as claimed in claim 9, wherein the shaft portion of the arbor extends from a surface of the flange portion that is opposite to the mounting surface of the pallet when the arbor is mounted to the pallet.

11. The fixing apparatus as claimed in claim 1, wherein the arbor further includes a cylindrical portion and an enlarged bore in the cylindrical portion,
   the flange includes a first side and a second side that is opposite to the first side, the shaft portion extend that extends from first side of the flange portion in a first direction, and the cylindrical portion extends from the second side of the flange portion in a second direction that is opposite to the first direction, and
   the socket includes a flanged head at a first end of the socket and a base at a second end of the socket that is opposite to the base, the flanged head extends into the enlarged bore, and the base is outside of the arbor.

12. A pallet assembly for removably securing a workpiece, the pallet assembly comprising:
a pallet including mounting surface facing the workpiece when the workpiece is secured to the pallet, and at least one hole in the mounting surface;
an actuator;
a collet assembly that is secured to the pallet, the collet assembly including:
a threaded adaptor that is configured to be rotated by the actuator;
an arbor including a flange portion and a shaft portion that defines exterior conical surfaces, the arbor defining a bore that extends through both the flange and shaft portions, the flange portion including a first surface, a second surface, and at least one mounting hole extending through the flange portion from the first surface to the second surface, the shaft portion extending from the first surface and away from the mounting surface of the pallet, and the second surface abutting the mounting surface of the pallet;
a draw cylinder disposed in communication with the threaded adaptor such that rotation of the threaded adaptor moves the draw cylinder in axially upward and downward directions, the draw cylinder extending through the bore of the shaft portion of the arbor;
a collet disposed around a periphery of the shaft portion of the arbor so as to be coaxial with the draw cylinder, the collet being disposed such that movement of the draw cylinder in the axially downward direction causes a flanged head of the draw cylinder to contact the collet and thereby cause the collet to also move in the axially downward direction, the collet including axially extending slots that define fingers therebetween and interior conical surfaces that are configured to communicate with the exterior conical surfaces of the shaft portion of the arbor such that axially downward movement of the collet moves the fingers in a radially outward direction to thereby increase an exterior diameter of the collet;
a socket disposed around a periphery of the draw cylinder so as to be coaxial with the draw cylinder, the socket receives a portion of the draw cylinder therein as the draw cylinder moves axially upward and downward, and the socket extends outside of the arbor; and
a bearing located between the arbor and the socket such that the bearing rotatably supports the socket on the arbor; and
a mount extending through each of the mounting hole of the flange portion of the arbor and the hole in mounting surface of the pallet to mount the arbor to the pallet.

13. The pallet assembly as claimed in claim 12, wherein the draw cylinder includes a draw plug and a draw bar, the draw plug including the draw shaft and the flanged head, the draw bar defining lower circumferentially extending exterior surfaces that contact the threaded adaptor.

14. The pallet assembly as claimed in claim 13, wherein the draw plug and the draw bar are unitarily formed.

15. The pallet assembly as claimed in claim 13, wherein the draw plug and the draw bar constitute separate elements that are connected together.

16. The pallet assembly as claimed in claim 13, wherein the draw bar defines upper circumferentially extending exterior keyed surfaces that communicate with interior surfaces of the flange portion of the arbor to impede rotation of the draw cylinder relative to the arbor.

17. The pallet assembly as claimed in claim 12, wherein the threaded adaptor is a double lock nut that includes upper and lower coaxial portions, the double lock nut being configured such that rotation of the threaded adaptor in one direction causes the upper and lower portions to be separated, while rotation in another direction causes the upper and lower portions to be in contact with each other.

18. The pallet assembly as claimed in claim 12, further including a sleeve member that is disposed between a base of the shaft portion of the arbor and the collet that is configured to impede axially downward movement of the collet when the exterior diameter of the collet has reached a fully expanded position.

19. The pallet assembly as claimed in claim 12, further including a pin that is configured to extend through apertures in sidewalls of the collet and the draw cylinder, and is configured to impede rotation of the collet relative to the draw cylinder.

20. A method of manufacturing a fixing apparatus that is configured to removably fix a workpiece to a pallet using an actuator, the method comprising:
configuring a threaded adaptor so as to be rotatable by the actuator;
configuring an arbor so as to include a flange portion and a shaft portion that defines exterior conical surfaces, and so that the arbor defines a channel that extends through both the flange and shaft portions;
disposing a draw cylinder so as to be in communication with the threaded adaptor, such that rotation of the threaded adaptor moves the draw cylinder in axially upward and downward directions;
configuring the draw cylinder so as to include a draw shaft that is at least partially disposed within the channel of the shaft portion of the arbor;
disposing a collet around a periphery of the shaft portion of the arbor so as to be coaxial with the draw shaft, the collet being disposed such that movement of the draw cylinder in the axially downward direction causes a flanged head of the draw cylinder to contact the collet and thereby cause the collet to also move in the axially downward direction;
configuring the collet so as to include axially extending channels that define fingers therebetween and interior conical surfaces that are configured to communicate with the exterior conical surfaces of the shaft portion of the arbor, such that axially downward movement of the collet moves the fingers in a radially outward direction to thereby increase an exterior diameter of the collet;
disposing a socket around a periphery of the draw cylinder so as to be coaxial with the draw cylinder such that the socket receives a portion of the draw cylinder therein as the draw cylinder moves axially upward and downward, the socket extends into the arbor, and the socket extends outside of the arbor; and
disposing a bearing between the arbor and the socket such that the bearing rotatably supports the socket on the arbor.

* * * * *